May 23, 1944.  A. S. HOWELL  2,349,433
MOTION PICTURE PROJECTOR SHUTTER AND HEAT SHIELD THEREFOR
Filed July 16, 1942
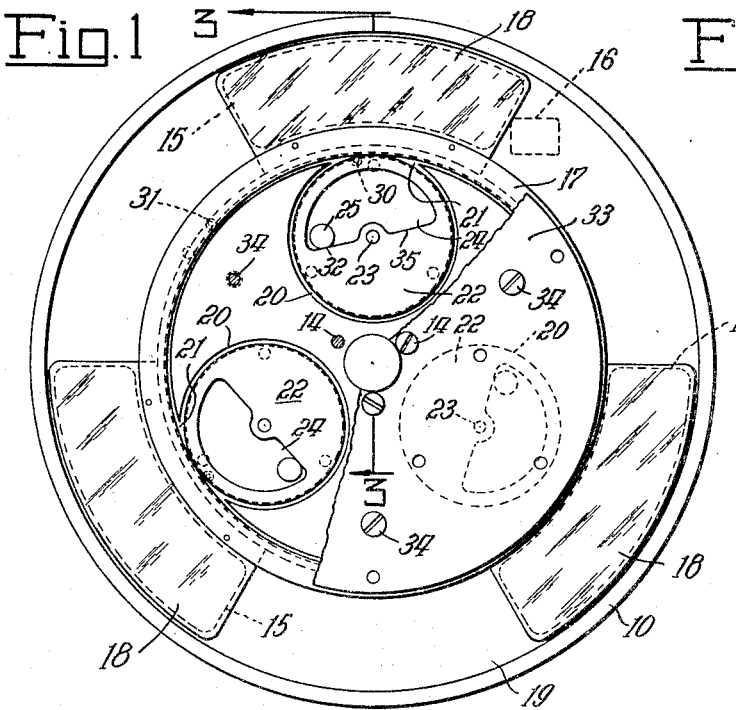
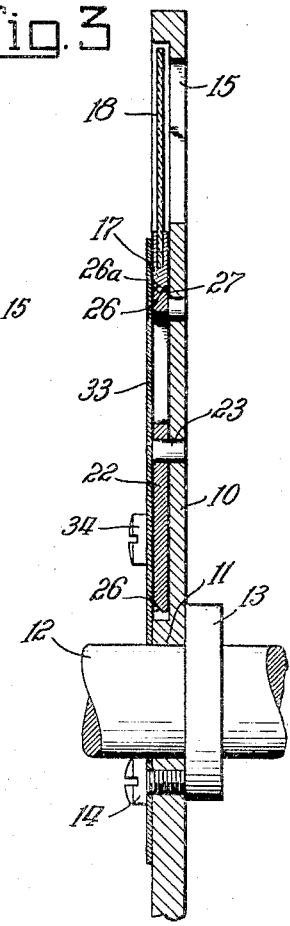
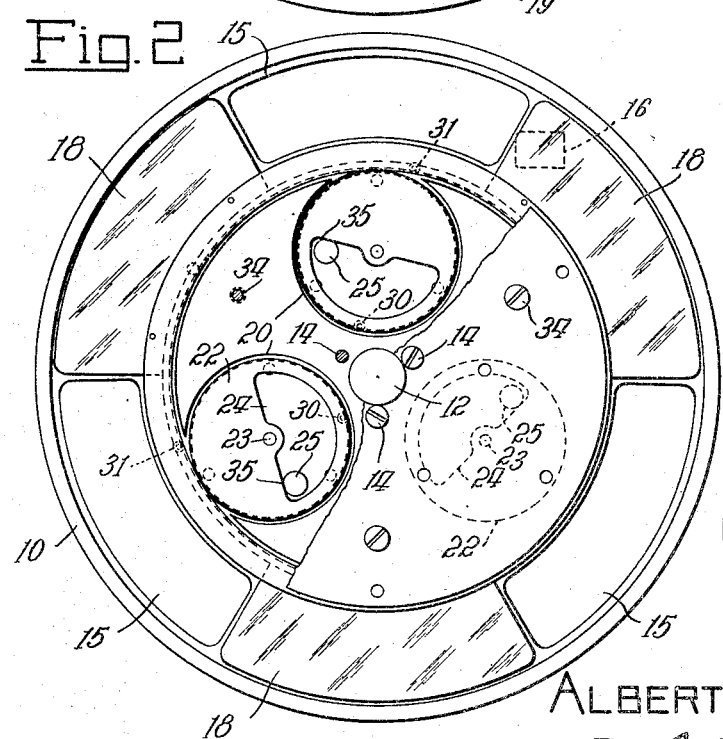
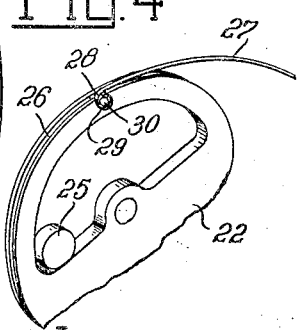
INVENTOR
ALBERT S HOWELL
BY
ATTY.

Patented May 23, 1944

2,349,433

UNITED STATES PATENT OFFICE 2,349,433

MOTION PICTURE PROJECTOR SHUTTER AND HEAT SHIELD THEREFOR

Albert S. Howell, Culver, Ind., assignor to The Bell & Howell Company, Chicago, Ill., a corporation of Illinois Application July 16, 1942, Serial No. 451,120

5 Claims. (Cl. 88—19.4)

My invention relates particularly to a motion picture projector shutter structure including a heat shield for interposition in the projector light beam between the light source and film during a portion of the periods when the beam is projected onto the film wherefore to prevent excessive heating of the film, together with a novel, compact, effective and inexpensively produced speed-responsive control operable, upon reduction in speed of the shutter, to increase the portion of said projection periods during which the shield is interposed in the beam.

In the drawing:

Fig. 1 is an end elevation of a shutter structure having associated therewith a heat shield and speed-responsive control therefor embodying the principles of the present invention;

Fig. 2 is a view like Fig. 1 but showing the parts in a different position of adjustment, namely, with the heat shield member out of registry with the light passing portions of the shutter disk;

Fig. 3 is an enlarged fragmentary sectional view taken on the line 3—3 of Fig. 1; and Fig. 4 is a fragmentary perspective view of one of the inertia disks forming part of the speed-responsive means for actuating the heat shield.

My invention is associated with and includes as one of its elements a shutter disk 10 having a central opening 11 facilitating mounting thereof upon a shutter drive shaft 12 of the usual character employed in motion picture projectors. Said shaft 12 has a flange 13, Fig. 3, to which the shutter disk 10 is secured by a plurality of machine screws 14.

The shutter disk has the usual light passing portions 15 in the form of apertures spaced radially from the axis of the disk and also spaced equi-angularly or 120° apart. During rotation of the shaft 12 and of the disk 10 these light passing portions are carried successively past a light aperture 16 of the well-known character provided in motion picture projectors and from which the projector light beam issues. The concentrated light issuing from the light aperture 16, if allowed to strike a frame of the projector film for a time period longer than that for which the projecting apparatus is designed for such light beam to strike a film frame, the film will become overheated and thus injured, in addition to creating a fire hazard. It will be understood that when the shutter disk rotates at a speed less than normal that the periods to which the film is exposed to the light beam will be lengthened because a greater time is required for the light passing portions 15 to traverse the beam issuing from the light aperture. The present structure employs a heat shield, comprising a ring 17 together with partially opaque heat shield members 18 secured thereon, which is rotatable coaxially with and rotatably adjustable relatively to the shutter disk for respective registration with the light passing portions 15 to cover or partially cover the light passing portions when the shutter disk rotates at speeds below normal or at zero speed and thus insure that the light beam will not play upon the film for periods of time longer than fall within safe limits.

The front face of the shutter disk 10, as viewed in Figs. 1 and 2, is provided with an annular groove 19 within which the ring 17 and shield members 18 are disposed, and the front face of the disk 10 is also provided with three circular recesses 20 of the same depth as the annular groove and spaced less distantly from the axis of the shutter disk than said groove and communicating therewith through respective gaps 21. Said recesses 20 are spaced equiangularly about the axis of disk 10, and each recess has disposed therein an inertia disk 22 pivotally mounted at the geometric center thereof on the shutter disk by means of a respective pivot pin 23 secured on the shutter disk. However, the disks 22 have segmental portions cut away to form openings 24 whereby the pivotal axes of these disks are disposed eccentrically of the centers of mass thereof. The openings 24 of the disks 22 provide space for receiving stop pins 25 secured on the shutter disk 10.

As so pivotally mounted, the inertia disks 22 are disposed within a plane-like space bounded by the inner periphery of the ring 17 and with a part of their peripheries in proximate or supporting relation with the inner periphery of the ring, and, having their centers of mass disposed eccentrically of their peripheries, are pivotally connected with the shutter disk on axes concentric with their peripheries and spaced angularly about and parallel to the axis of the shutter disk.

Each inertia weight 22 is provided with a groove 26 extending about its edge periphery. A groove 26a of like depth and transverse dimensions with respect to the grooves 26 extends about the inner periphery of the heat shield ring 17. These grooves 26 and 26a are for receiving longitudinal springs 27 respectively associated with the inertia disks 22. Said springs 27 are connected respectively between the inertia disks 22 and the heat shield ring 17 in such a manner that rotation of the disks 22 in one direction will cause the springs 27 to be wound onto their edge peripheries to lie within a portion of their grooves 26 incident to being payed out from the grooved inner periphery of the heat shield ring. The manner of connecting the springs 27 with the inertia disks is illustrated in Fig. 4 where it will be seen that the spring there shown has a loop 28 upon its end that is slipped into a recess 29 in the disk and about a pin 30 fixed on the disk and arranged coaxially with said recess. The recesses 29 are exposed toward the front faces of their disks 22 as well as being arranged communicatively with their grooves 26 so that the springs 27 can extend from the recesses 29 to lie flatly within their respective grooves 26. The opposite ends of the springs 27 are also looped and similarly secured by means of pins 31 corresponding to the pins 30 but upon the heat shield ring 17. As viewed in Figs. 1 and 2 the ends of the springs 27 connected with the ring 17 through the pins 31 are disposed clockwise from their ends that are connected with the disks 22. Therefore, it will be seen that upon counter-clockwise rotation of the disks 22 for winding the springs 27 into their peripheral grooves 26 pursuant to paying out that portion of the springs 27 lying within the ring groove 26a that, because of the springs being connected with the ring 17 through the pins 31, the ring 17 will be caused to rotate counter-clockwise. For example, referring to Fig. 1, the ring 17 is shown at the clockwise limit of rotative adjustment as are the inertia disks 22 with their edge portions 32 of their segmental openings 24 abutting against the pins 25. While the ring 17 and the inertia disks 22 are in this position, a substantial portion of the springs 27 will be projected outwardly through the gaps 21 in the clockwise direction and lie within the groove 26a upon the inner periphery of the ring 17. Therefore, as the inertia disks are rotated counter-clockwise, as aforesaid, to wind the springs 27 onto their grooved peripheries, the springs will pull their anchorage pins 31 toward their respective inertia disks 22 and thus cause counter-clockwise rotation of the ring 17. In Fig. 3 it will be observed that the grooves 26 in the inertia disks 22 and the inner peripheral groove 26a of the ring 17 are so spaced and are of such dimensions, with respect to the springs 26, that the portions of said springs between the opposed adjacent parts of the disks 22 and of the ring 17 provide a supporting medium for said ring. Consequently there is a slight clearance between the inner side of the annular groove 19 and the inner peripheral edge of the ring 17 as is plainly seen in Figs. 1 and 2. This slight radial spacing of the ring 17 from the center portion of the disk 10 eliminates frictional drag and in this respect is conducive to accuracy in the operation of the speed-responsive mechanism comprising the inertia disks 22. Those portions of the springs 27 disposed within the opposed parts of the grooves 26 and 26a also prevent displacement of the ring 17 axially of the shutter plate 10 and thus keep the back side of the ring out of frictional engagement with the front face of the shutter plate and similarly keep the front side of said ring out of frictional engagement with the back face of a disk shaped guard plate 33 which is held in place upon the shutter disk by means of the aforesaid machine screws 14 and additional machine screws 34.

The springs 27 have a tendency to straighten out or to attain a curvature of greater radius than the peripheral curvature of the inertia disks 22, wherefore upon the termination of a force which has been effective for rotating the inertia disks counter-clockwise incident to winding the springs onto the periphery of said disks, this bias character of the springs is effective for restoring said disks and the ring 17 to the position shown in Fig. 1 by causing clockwise rotation of these parts about their respective axes. When the shutter plate 10 is at rest the inertia disks 22 and the ring 17 will occupy the position shown in Fig. 1 wherein the shield members 18 are in registry with the light passing portions 15 of the shutter disk. When, however, the shutter disk is rotated pursuant to operation of the projector apparatus the inertia disks 22 because of the disposition of their center of mass with respect to radial lines drawn from the axis of the shutter plate respectively through the axes of the inertia disks, as is plainly ascertainable in Fig. 1, will be acted upon by centrifugal force to be rotated counter-clockwise for causing rotation of the ring 17 counter-clockwise in the above described manner. During normal operation of the projector apparatus the shaft 12 and the shutter disk 10 will be rotated at sufficient speed for developing an adequate centrifugal force with respect to the inertia disks as to cause them to rotate counter-clockwise to the limit illustrated in Fig. 2 where the edge portions 35 in the cutaway parts of said disks are in abutting relation with the stop members 25. This rotation of the inertia disks winds enough of the springs 27 onto their peripheries to rotate the ring 17 sufficiently far to carry the heat shield members 18 completely out of registry with the light passing portions 15.

Under normal operating conditions of the projector apparatus the speed of the shutter plate 10 is sufficient that the exposure periods of the light beam onto the film will be so short in duration that no injury to the film will occur. When, however, the projector apparatus operates at a slower speed at which the exposure periods of the light beam upon the film are undesirably long, the speed-responsive means comprising the inertia disks will become effective, under the force exerted by the springs 27 in the aforesaid manner, to cause clockwise adjustment of the ring 17 relatively to the shutter disk, thereby circumferentially adjusting the heat shield members 18 to project a portion thereof into registry with a portion of their respectively associated light passing portions 15. By thus covering a portion of the light passing portions the duration of the light exposure periods will be correspondingly shortened for any certain speed of the shutter disk. Consequently it is possible to select springs 27 of such strength as to cause adjustment of the light shield members with respect to covering relation with the light passing portions 15 that for any operating speed of the shutter plate the light exposure periods onto the film will be substantially as long as it is safe for them to be. When the projector apparatus stops operation and the shutter disk comes to rest the springs 27 will restore the parts to the position illustrated in Fig. 1, causing the shield members 18 to completely cover the light passing portions 15 so that irrespective of whether one of the light passing portions stops in registry with the light aperture 16 the film will be shielded from the light projector beam.

It will be seen that my improved structure, in addition to having but few simply constructed and easily assembled parts, also is extremely compact, adapting the apparatus to occupy space provided solely for the shutter plate in conventional projectors. The annular recess 19 in the shutter plate 10 enables the light shield ring and the light shield members 18 carried thereon to fit within the plane of said shutter plate, while the circular recesses 20 similarly receive the inertia disks 22 within the plane of the shutter disk. Consequently my improved structure is adapted to be interchanged for any rotatable shutter plate in motion picture projecting apparatus.

While the partially opaque heat shield members 18 obstruct sufficient light to prevent damage to a film being projected at abnormally slow and zero shutter speeds, they pass sufficient light to effect a projected picture at such slow and zero speeds.

While I have thus described my invention, I do not wish to be limited to the precise details described, as changes may be readily made without departing from the spirit of my invention, but having thus described my invention, I claim as new and desire to secure by Letters Patent the following:

1. In a motion picture projector, a shutter structure comprising a rotatable shutter disk having a light passing portion displaced radially from the axis of rotation to periodically traverse a projector light beam of such projector pursuant to rotation of said shutter, a heat shield ring rotatable coaxially with said disk, a heat shield member on said ring overlappable with said light passing portion axially of the disk, said ring being rotatively adjustable relatively to said disk to determine the amount of such overlap, speed-responsive means comprising inertia disks disposed in flatwise juxtaposition with the shutter disk, said inertia disks having their centers of mass disposed eccentrically of their peripheries and being pivotally connected with said shutter disk on axes concentric with their peripheries and spaced angularly about and parallel to the axis of said shutter disk to be urged in one direction by centrifugal force incident to rotation of said shutter disk, said inertia disks being within a plane-like space bounded by the inner periphery of said ring and with a part of their peripheries in proximate relation with such inner periphery, said outer peripheries of the inertia disks being smaller in diameter than the inner periphery of said ring, elongated springs connected respectively between the inertia disks and said ring, said springs being windable onto the peripheries of their respective inertia disks while being payed out from the inner periphery of said ring to occupy one position and then unwindable from said inertia disk peripheries onto said ring periphery to occupy another position, incident to rotation said ring in one direction toward one limit of the aforesaid adjustment while winding onto said inertia disks and rotating said ring in the opposite direction toward the other limit of such adjustment while unwinding from said inertia disks, said springs being biased toward one of their said positions to urge said ring into the adjustment wherein the heat shield member is in registry with said light passing portion, and the pivotal movement of said inertia disks under said centrifugal force being in the direction to place said springs in the other of their positions and to thus displace the shield member from said light passing portion.

2. In a motion picture projector, a shutter structure comprising a rotatable shutter disk having a light passing portion for periodically traversing a projector light beam of such projector during rotation of the shutter, a heat shield ring having an inner peripheral groove and rotatable coaxially with said disk, a heat shield member operably connected with said ring and overlappable with said light passing portion axially of the disk, said ring being rotatively adjustable relatively to said disk to determine the amount of such overlap, speed-responsive means comprising inertia disks having respective peripheral grooves and disposed within a plane-like space bounded by the inner periphery of said ring and with a part of their grooves in opposed proximate relation with parts of said inner peripheral groove at points spaced therealong, said inertia disks having their centers of mass disposed eccentrically of their peripheries and being pivotally connected with said shutter disk on axes concentric with their peripheries and spaced angularly about and parallel to the axis of said shutter disk to be urged in one direction by centrifugal force incident to rotation of said shutter disk, and elongated flexible members connected respectively between said grooved disks and said ring and having a portion respectively transferable between the grooves of the grooved disks and the groove of said ring pursuant to rotation of the grooved disks and to cause the aforesaid rotative adjustment of said ring, and parts of said portions of the elongated flexible members being disposed within the opposed parts of said grooves to serve as carrying means for said ring and to preclude axial movement thereof relatively to said grooved disks.

3. The combination set forth in claim 2, wherein said elongated flexible members are springs biased for tending to create therein a curvature greater in radius from that of the curvature incurred thereby when lying within the grooves of their disks, for urging said shield ring toward a limit of its rotative adjustment.

4. In a motion picture projector shutter structure, a rotatable shutter disk having within a face thereof an annular groove coaxial therewith, light passing openings spaced circumferentially of the disk within the bottom of said groove and a plurality of recesses within a face of said disk, said recesses being spaced less distantly from the axis of said shutter disk than said groove and spaced angularly about said axis and said disk also having gaps respectively communicating between said recesses and said groove, a heat shield ring disposed in said groove and having an inner periphery adjacently to and coaxial with said inner edge thereof, heat shield means on said ring within said groove and variable in overlapping relation with said light passing openings pursuant to rotational adjustment of said ring relative to said shutter disk, speed-responsive means comprising ring driving disks respectively in said recesses, said driving disks being rotatably mounted on said shutter disk on axes concentric with the peripheries of the driving disks and parallel to the axis of the shutter disk and having a part of their peripheries at said gaps in supporting relation with said ring, and means on said edge peripheries and upon the inner periphery of said ring for maintaining a predetermined rotative relation between said disks and said ring and to cause the ring to incur said rotative adjustment in accordance with the amount and direction of rotation of said driving disks.

5. The combination set forth in claim 4, wherein the means on the edge peripheries of said driving disks and upon the inner periphery of said ring for causing the ring to incur said rotative adjustment comprises elongated springs respectively connected between said driving disks and said ring, and said springs extending respectively through said gaps as a supporting medium between the peripheries of their respective driving disks and the inner periphery of said ring and being transferable between said inner periphery and the peripheries of their respective driving disks incident to rotation of said driving disks wherefore to impart said rotative adjustment to said ring, and said springs being biased for tending to create therein a curvature greater in radius from that of the curvature incurred thereby when lying about the peripheries of said driving disks, for urging said ring to rotate toward a limit of its rotative adjustment.

ALBERT S. HOWELL.